United States Patent [19]

Loizeau

[11] Patent Number: 4,474,277
[45] Date of Patent: Oct. 2, 1984

[54] CLUTCH TORSION DAMPER

[75] Inventor: Pierre Loizeau, Ville d'Avray, France

[73] Assignee: Societe Anonyme Francaise du Ferodo, Paris, France

[21] Appl. No.: 447,663

[22] Filed: Dec. 7, 1982

Related U.S. Application Data

[63] Continuation of Ser. No. 148,274, May 9, 1980, abandoned.

[30] Foreign Application Priority Data

May 11, 1979 [FR] France ............................ 79 11968

[51] Int. Cl.³ .............................................. F16D 3/66
[52] U.S. Cl. .................................................. 192/106.2
[58] Field of Search ............... 192/106.1, 106.2, 70.17, 192/70.18; 464/67, 68

[56] References Cited

U.S. PATENT DOCUMENTS

| 2,234,443 | 3/1941 | Macbeth | 192/106.1 |
| 3,811,545 | 5/1974 | Sato et al. | 192/106.1 |
| 4,354,586 | 10/1982 | Stanley | 192/106.2 |
| 4,376,477 | 3/1983 | Loizeau | 192/106.2 |
| 4,396,103 | 8/1983 | Loizeau | 192/106.2 |

Primary Examiner—George H. Krizmanich
Attorney, Agent, or Firm—Charles E. Brown

[57] ABSTRACT

A torsion damper which comprises two coaxial parts mounted for rotation relative to one another within the limits of a determined angular movement, and against the action of springs. There is also at least one intervening device which is sensitive to the angular movement between the parts and which is movable reversibly between a waiting position, in which it is inoperative, and, beyond a determined value of the movement, an operating position, in which the intervening device causes a modification of the operation characteristics of the torsion damper. The torsion damper is particularly usable in clutch plate assemblies for motor vehicles.

30 Claims, 22 Drawing Figures

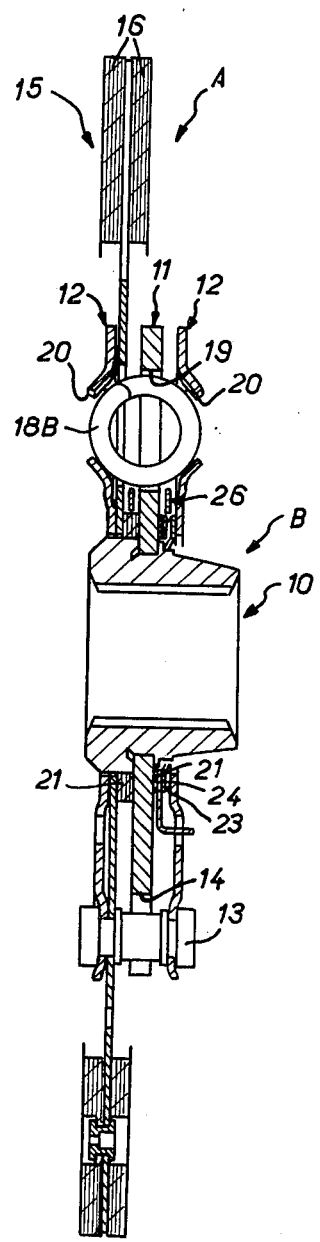
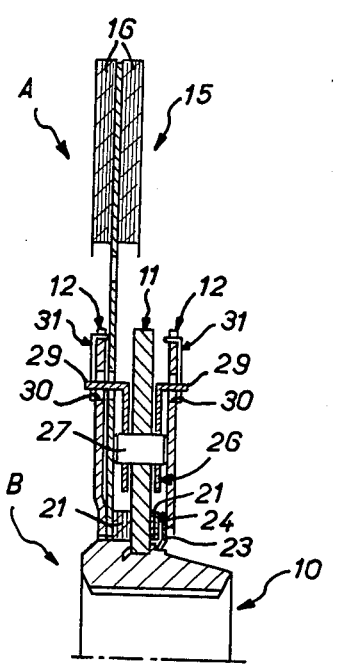
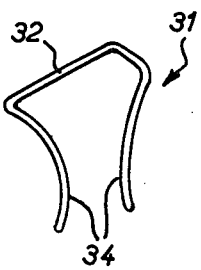

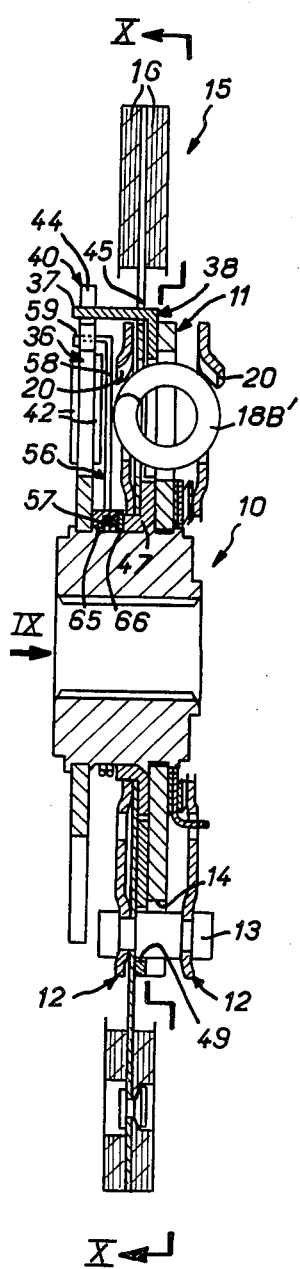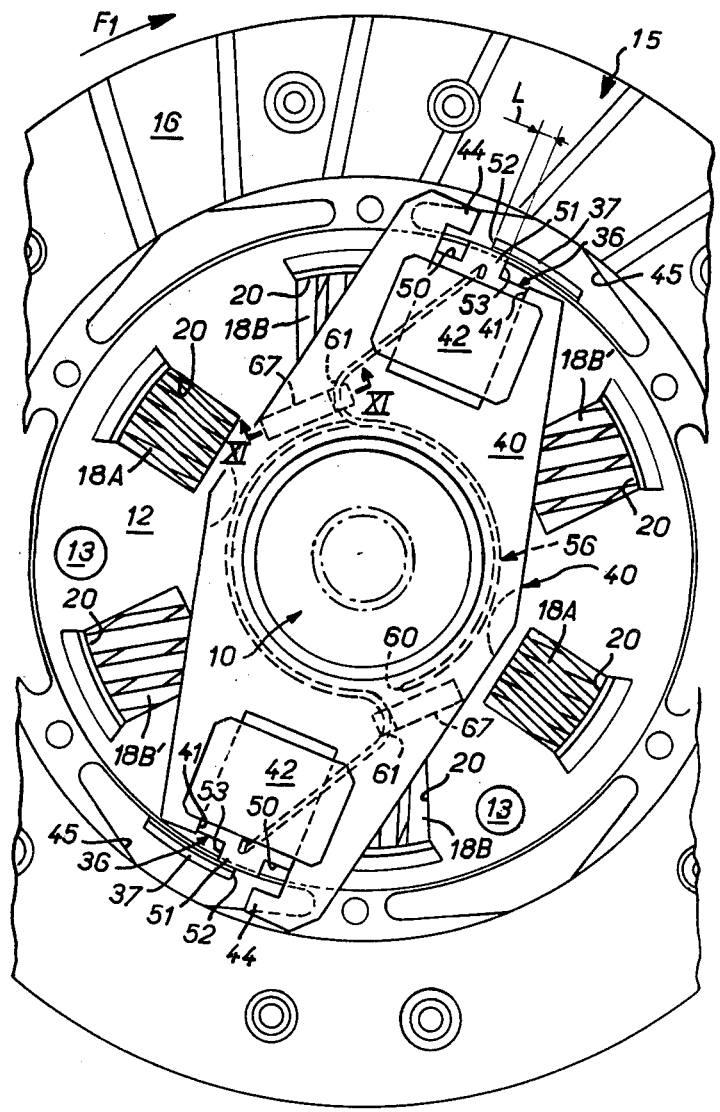

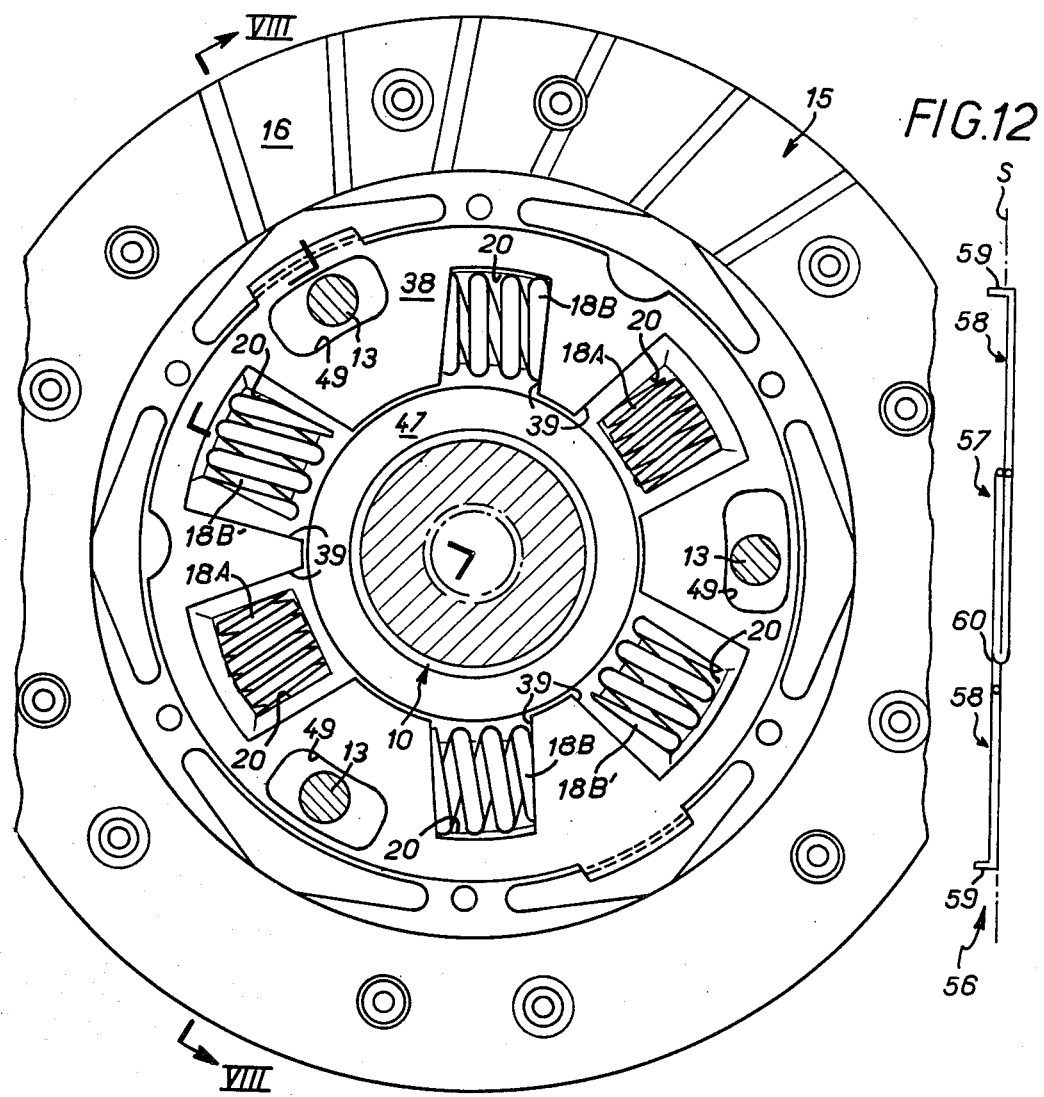
FIG.10
FIG.12
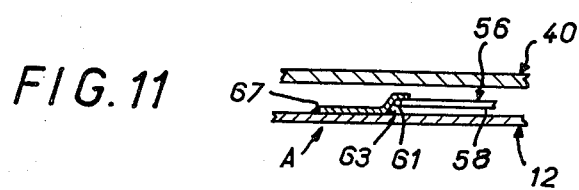
FIG.11

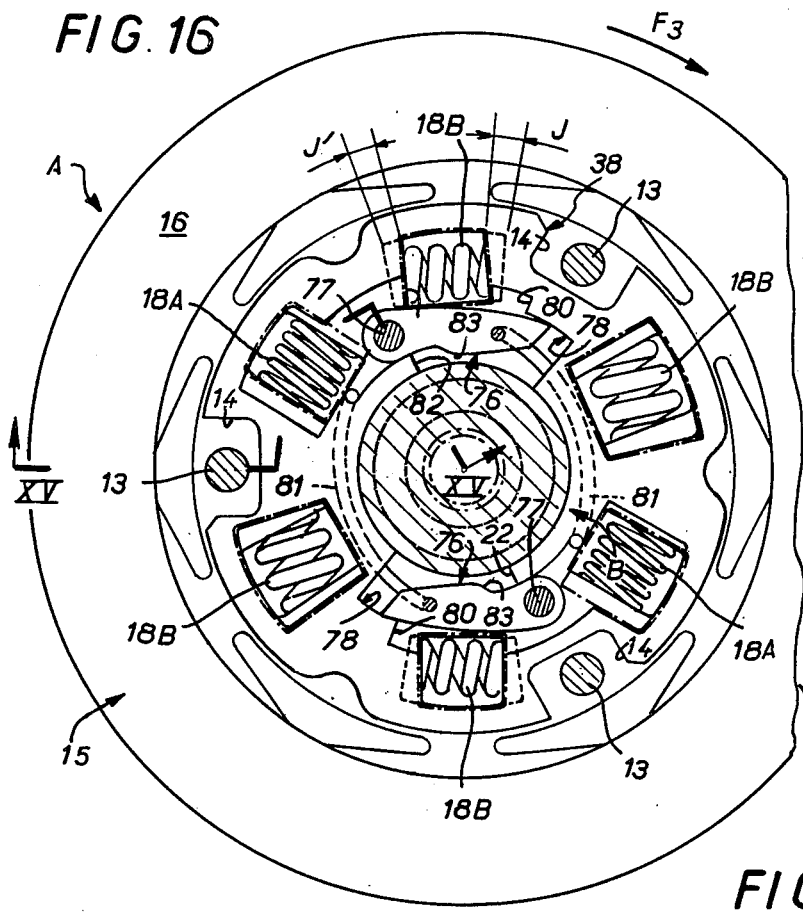
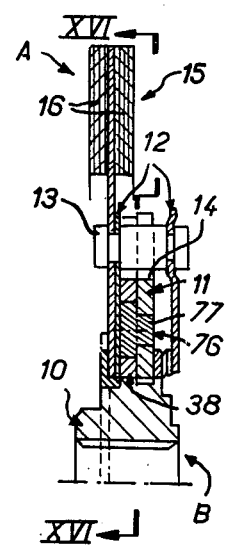
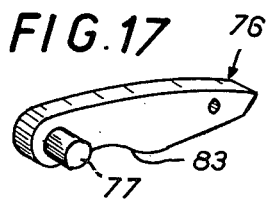
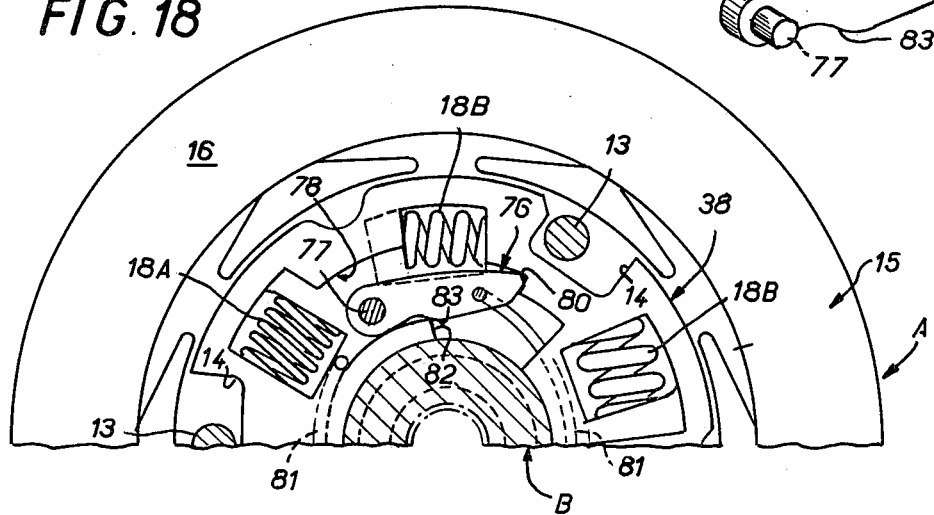

CLUTCH TORSION DAMPER

This is a continuation of application Ser. No. 148,274 filed May 9, 1980, now abandoned.

The present invention relates generally to torsion damper devices which comprise at least two coaxial parts mounted for rotation relative to one another, within the limits of a determined angular movement, against the action of resilient members adapted to act circumferentially between the said parts, these members being hereinafter referred to as circumferential action resilient members, for at least a range of the said angular movement.

In practice, each of the parts in question comprises an annular component, these components being parallel to one another, and the resilient members provided between them are each individually housed partly in an aperture in the annular component of one of the said parts and partly in an aperture in the annular component of the other of the said parts.

As is known, a torsion damper device of this kind normally forms part of a clutch plate assembly, particularly for a motor vehicle, in which case one of its rotatable parts carries a friction disc intended to be rotationally fixed to a first shaft, which in practice is a driving shaft, namely the output shaft of an engine, while another of the said rotatable parts is carried by a hub intended to be rotationally fixed to a second shaft, which in practice is a driven shaft, namely the input shaft of a gearbox.

A device of this kind makes it possible in fact to effect regulated transmission of the torque applied to one of its rotatable parts when the other is itself subjected to a torque, that is to say to filter out the vibrations liable to occur throughout the length of the kinematic chain, extending from the engine to the controlled wheel shafts, in which it is inserted.

As is also known, it is advantageous, at least for certain applications and in particular for application to clutch plate assemblies for motor vehicles, that, for the low values of the angular movement between the two rotatable parts of which a torsion damper device of this kind is composed, the torque transmitted between them should remain low.

This arrangement, which entails the use of circumferential action resilient members of slight stiffness for the low torque values, in fact makes it possible in particular to eliminate gearbox noise in neutral, when the vehicle concerned is stationary (this noise being referred to hereinafter as neutral noise), particularly in the hot state.

Moreover, it appears that it is at least to a certain extent desirable, from this point of view alone, that the range of angular movement in the course of which these resilient members of slight stiffness thus intervene should be as wide as possible.

In practice, so that the resilient members of slight stiffness are effectively the only members to intervene for the low torque values, the apertures in the annular component of the two coaxial parts of which the torsion damper device in question is composed have one and the same circumferential development from one of the parts to the other, while in the case of the other resilient members interposed between the said parts, which members have a higher stiffness, the apertures in the annular component of the driving part, in which apertures these resilient members are housed, have a different circumferential development from the corresponding apertures in the annular piece of the driven part.

Thus, as soon as a gear speed has been engaged and the accelerator of the vehicle concerned is operated to achieve "traction" operation of the whole arrangement, the resilient members of high stiffness only intervene after the circumferential play between the corresponding edges of the apertures in which the members are housed, from the driving part to the driven part, has been taken up.

Likewise, when the action on the accelerator is terminated and the torque between the two rotatable parts of which the torsion damper device in question is composed changes direction, the operation of the whole arrangement then changing over to so-called "overrun", the resilient members of high stiffness, previously compressed between the driving part and the driven part, expand until, finding a support at each of their ends on the edges of those apertures in the driven part in which the members are housed for the rest configuration of the while arrangement, which apertures are those of smaller circumferential development, the resilient members of high stiffness again allow only the resilient members of slight stiffness to intervene and are then recompressed, and vice versa when a further action is exerted on the accelerator.

In practice, when the action on the accelerator is terminated, the change in direction of the torque is virtually instantaneous.

Now, whichever of the two directions is involved, the resilient members of slight stiffness, which intervene each time for the low torque values, are very rapidly saturated.

The result of this, when the action on the accelerator is terminated or is exerted again, is an instantaneous and noisy rocking of one of the two parts of which the torsion damper disc in question is composed, relative to the other part, this rocking corresponding to the taking-up of play between the said parts because of saturation, first in one direction and then in the other, of the resilient members of slight stiffness which intervene between the said parts.

In practice, the noise which accompanies this rocking is the louder, on the one hand the larger the angular movement range between the two rotable parts in question, corresponding to the elastic members of slight stiffness, and on the other hand the lower the gear ratio engaged.

Thus, two contradictory requirements have to be reconciled, one of them relating to the use of an angular movement range in which, at low torque values, only circumferential action resilient members of slight stiffness intervene in order to achieve good absorption of neutral noise, particularly for diesel engine vehicles in which the idling speed is particularly low and cyclic accelerations are particularly great, and the other relating to the taking-up of angular play usually associated with such a range when changing over from "traction" operation, with the accelerator depressed, to "overrun" operation, with the accelerator released, and vice versa, this taking-up of angular play being also a source of noise and this noise being the greater, the wider the said range itself.

In order to overcome this difficulty, it has been proposed in French patent application No. 79/04,719, filed on the Feb. 23, 1979 and published under No. 2,449,828, to use a locking means sensitive to centrifugal force against the action of return means, the locking means being thus mounted for reversible movement between a retracted waiting position, in which it is out of action and thus allows full liberty of action to the circumferential action resilient means interposed between the two parts concerned, and an extended operating position in which, beyond a determined speed of rotation associated with the said return means, it brings about positive circumferential support of one of the parts on the other for at least one of the directions of rotation, and thus puts the circumferential action resilient means out of action or, more generally, modifies the operational characteristics of the whole arrangement.

Although this arrangement has given and is still giving satisfaction, for certain vehicles it may prove defective or be difficult to use when the speed of rotation of the engine is low.

This is particularly the case with vehicles equipped with a diesel engine which develops a constant torque and permits the maintaining of the engagement of a gear speed even at low speeds of rotation.

For example, it is possible to maintain the engagement of a gear speed down to about 1,000 revolutions per minite, while the idling speed of the engine is of the order of 750 revolutions per minute.

Consequently, if the driver relaxes the pressure on the accelerator pedal at so low an engine speed, there will be only a difference of 250 revolutions per minute to permit the intervention of the locking means sensitive to centrifugal force, and this difference may be insufficient to enable this intervention to develop correctly.

The present invention relates generally to an arrangement giving satisfaction with complete safety, even in the case of low speeds of rotation.

More precisely, it firstly relates to a torsion damper device, particularly a clutch plate assembly, especially for a motor vehicle, of the type comprising at least two coaxial parts mounted for rotation relative to one another, within the limits of a determined angular movement, against the action of resilient members adapted to act circumferentially between them for at least a range of the said angular movement, the members being referred to as circumferential action resilient members, which torsion damper device is characterised in that it comprises at least one means, hereinafter referred to as an interposition means, which is sensitive to the angular movement between the parts, against the action of return means, and which is thus movable reversibly between a waiting position, in which it is inoperative, and, beyond a determined value of the movement, an operating position, in which, directly or indirectly bearing circumferentially on either one of the parts, it is adapted to provide circumferential support for at least one of the resilient members, with the result that the operational characteristics of the device are thereby modified.

According to a first possible embodiment of the invention, the interposition means according to the invention is carried by one of the rotatable coaxial parts of which the torsion damper device in question is composed, and it is adapted to provide, by itself, in the operating position, circumferential support for at least one of the resilient members interposed between the parts.

As a variant, according to another possible embodiment of the invention, there are associated with the interposition means according to the invention, on the one hand a support means, which extends axially and with which, in the operating position, the member is adapted to bring about positive circumferential support, and on the other hand an annular plate, which is engaged by means of recesses, such as apertures or grooves, on the resilient members provided between the rotatable coaxial parts of which the torsion damper device in question is composed, without circumferential play at least for that member of the resilient members which is involved, that is to say the member with which the interposition means is to cooperate, and with circumferential play for the other resilient members, and which forms a piece carrying any one of the interposition and support means, while the other is fixed to a component belonging to either one of the parts, with the result that, in this case, it is by means of the annular plate that the interposition means is adapted to provide circumferential support at least for the resilient member which is involved.

Whatever the case may be, in neutral, with the vehicle stationary, the angular movement between the two rotatable parts of which the torsion damper device in question is composed remains reduced, and the interposition means which the device comprises according to the invention is then inoperative; the circumferential action resilient members of slight stiffness and of high stiffness, which are provided between the parts, then all intervene freely between these parts over the whole of the angular movement range allocated thereto, regardless of the width of this range.

On the other hand, when the vehicle is in motion and the angular movement between the two rotatable parts of which the torsion damper device is composed becomes sufficiently large, the interposition means according to the invention changes over from its above-mentioned waiting position, which is referred to in this text as the retracted waiting position by way of convenience, to its operating position, which is referred to in this text as the extended working position by way of convenience.

Thus, although the locking means according to the invention is inevitably sensitive to centrifugal force, as a component of a rotatable assembly, it is essentially in dependence on the angular movement between the two coaxial parts constituting the torsion damper device in question, and therefore in practice on the torque transmitted from one of these parts to the other, that, for a determined value of the movement, the changeover of this locking means from its retracted waiting position to its extended operating position is controlled in a positive manner.

In other words, this changeover is effected reliably whatever the speed of rotation of the device.

For the extended operating position of the interposition means according to the invention, circumferential support is made available for one of the resilient members, which in practice is an elastic member of high stiffness, with the result that the course of expansion of the member is interrupted.

Everything then proceeds as if the specific geometry of the torsion damper device in question, which geometry is associated with the circumferential play, from the driving part to the driven part, between the apertures in which the resilient members are housed, were modified, at least for one of the members.

In other words, everything proceeds as if, for the resilient member in question, the circumferential development of the aperture in the annular component of one of the two rotatable coaxial parts in which the member is partly housed were capable of assuming either one of two values, one value when the interposition means according to the invention is in the retracted waiting position and the other value when the interposition means is in the extended operating position.

In this respect, the present invention further relates to a torsion damper device, particularly a clutch plate assembly, of the type comprising at least two coaxial parts mounted for rotation relative to one another, within the limits of a determined angular movement, and against the action of resilient members adapted to act circumferentially between them for at least a range of the said angular movement, each of the parts comprising an annular component, the components being parallel to one another, and the resilient members each being individually housed partly in an aperture in the annular component of one of the parts and partly in an aperture in the annular component of the other of the parts, which torsion damper device is characterised in that it comprises at least one means, hereinafter referred to as an interposition means by way of convenience, which is sensitive to the angular movement between the said parts, against the action of return means, and which is thus movable reversibly between a waiting position, in which it is inoperative, and, beyond a determined value of the movement, an operating position, in which, for at least one of the resilient members, it either directly or indirectly takes the place of one of the radial edges of one of the apertures in which the resilient member is housed.

It is clear from the foregoing text that, depending on the position of the interposition means according to the invention, the operational characteristics of the torsion damper device in question are different.

In fact, when the interposition means according to the invention is in the extended operating position, the action of the resilient members is modified and, in particular, the resilient members of slight stiffness are prevented from intervening by themselves at low torque values.

Thus, any noise is avoided on changing over from "traction" operation to "overrun" operation, and this is the case whatever the width of the angular movement range within which the resilient members of slight stiffness intervene for the neutral position when the vehicle is stationary.

Consequently, this range can be made as wide as is necessary for good absorption of the neutral noise.

The characteristics and advantages of the invention will moreover be clear from the following description, which is given by way of example and with reference to the accompanying diagrammatical drawings, in which:

FIG. 2 is a view in axial section of the device, taken on the section line II—II in FIG. 1;

FIG. 3 is another half-view in axial section of the device, taken on the section line III—III in FIG. 1;

FIG. 4 is a view in perspective, on a larger scale, of one of the elements employed in the torsion damper device, this element being shown in isolation;

Figure 1:
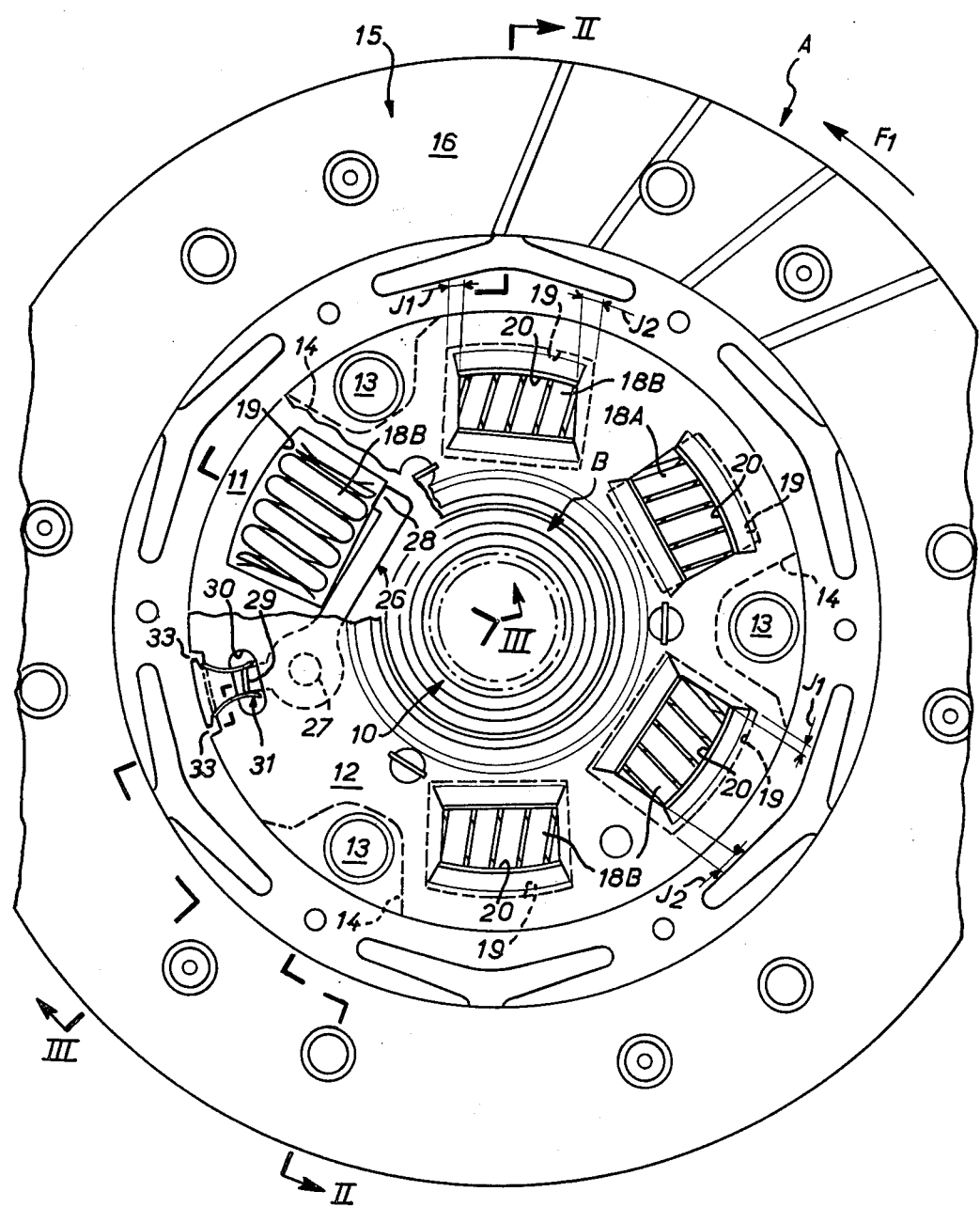
FIG. 1 is a partial view in elevation, with part broken away, of a torsion damper device according to the invention, the locking means with which it is provided being shown in the retracted waiting position.
Figure 5:
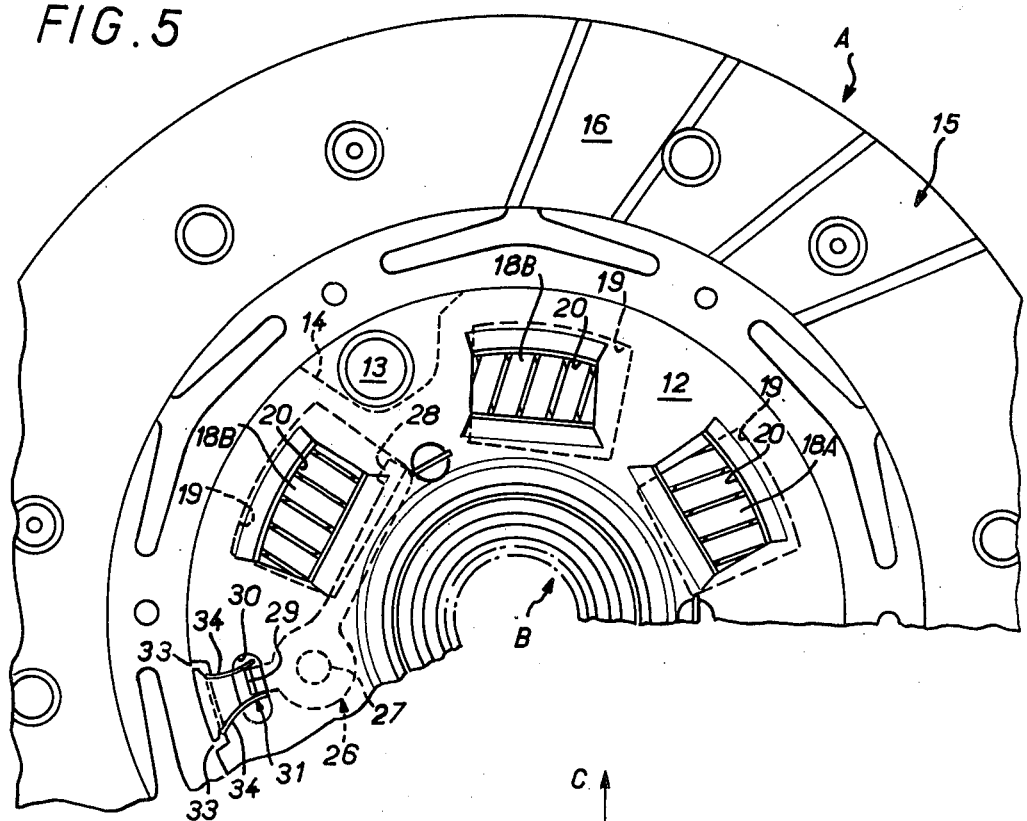
Figure 6:
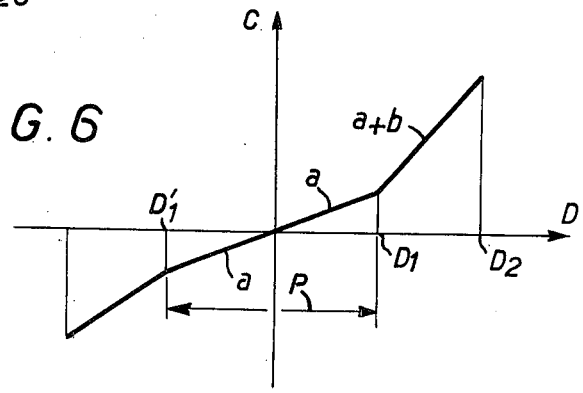
Figure 7:
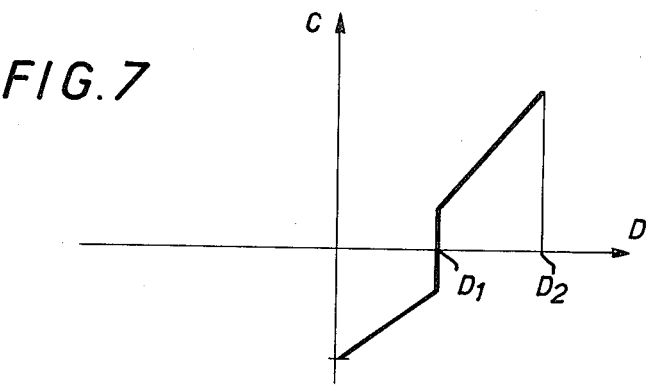
Figure 14:
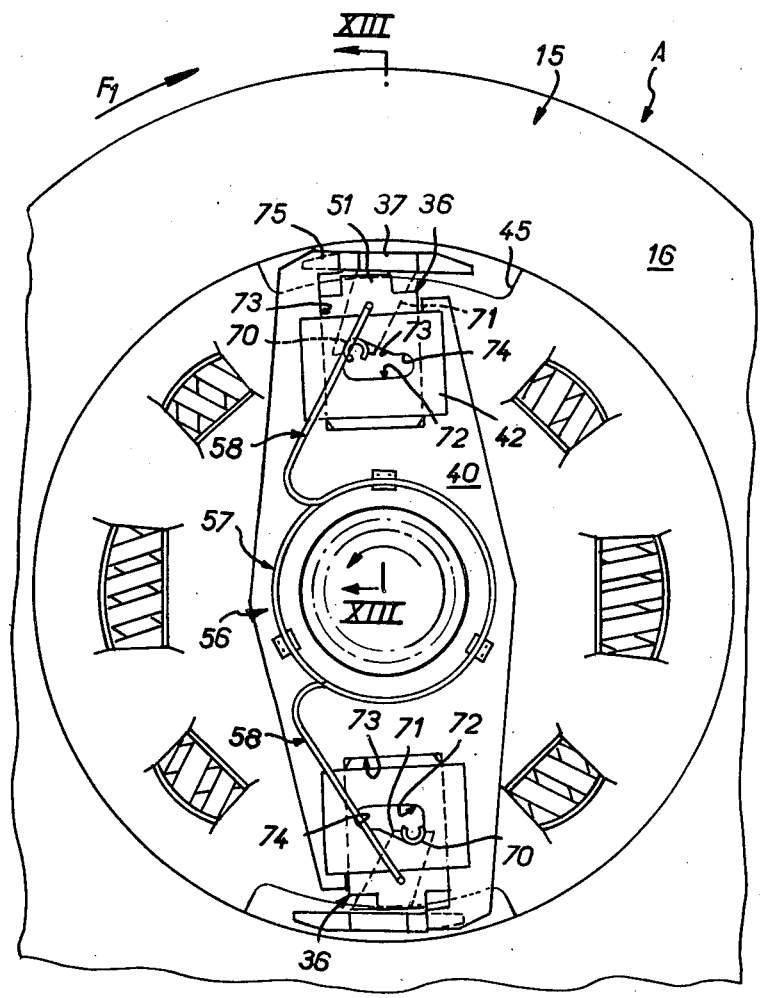
Figure 13:
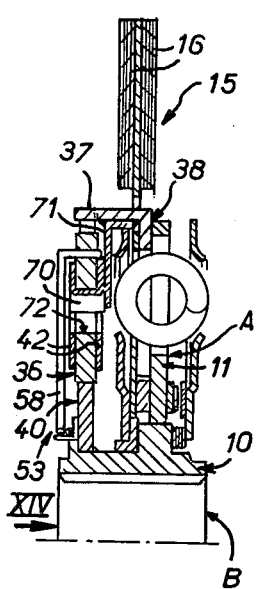
Figure 19:
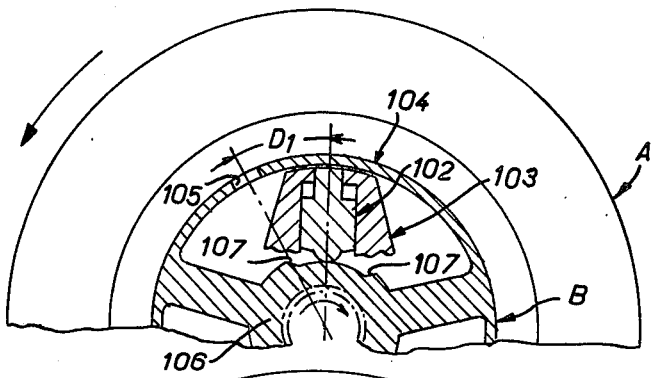
Figure 20:
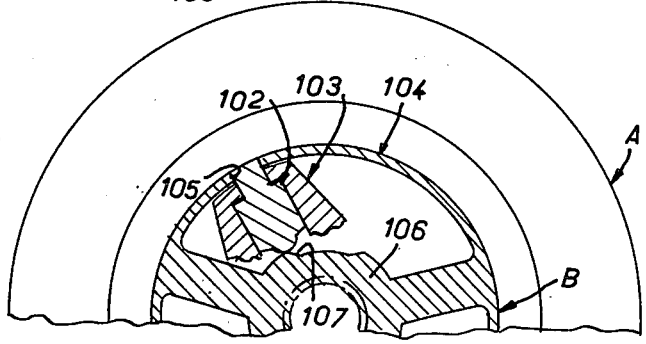
Figure 21:
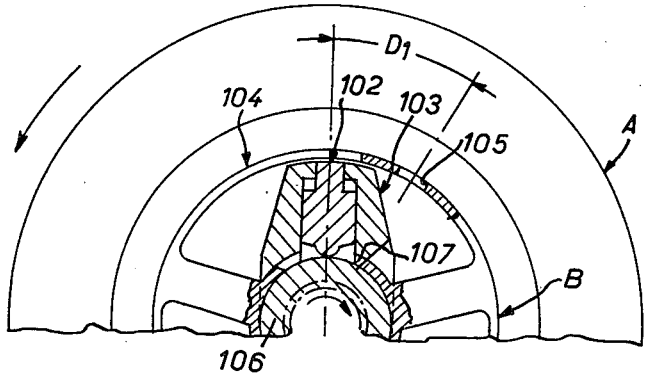
Figure 22:
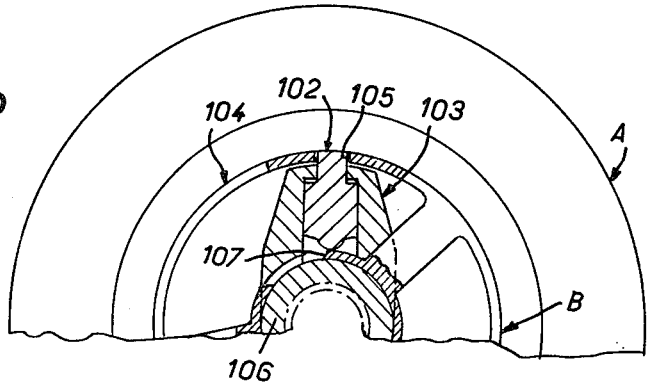

FIG. 5 repeats part of FIG. 1, the interposition means being in the extended operating position;

FIGS. 6 and 7 are graphs illustrating the mode of operation of the torsion damper device according to the invention;

FIG. 8 is a view in axial section, taken on the section line VIII—VIII in FIG. 10, of another torsion damper device according to the invention;

FIG. 9 is a partial view in elevation of this device, taken in the direction of the arrow IX in FIG. 8;

FIG. 10 is a partial view in transverse section of the device, taken on the section line X—X in FIG. 8;

FIG. 11 is a partial view in transverse section of the device, taken on the line XI—XI in FIG. 10;

FIG. 12 is a view in axial section of a torsion spring with which this torsion damper device is provided;

FIG. 13 is a half-view in axial section, taken on the line XIII—XIII in FIG. 14, of another torsion damper device according to the invention;

FIG. 14 is a partial view in elevation of the device, taken in the direction of the arrow XIV in FIG. 13;

FIG. 15 is a half-view in axial section of another torsion damper device according to the invention, taken on the section line XV—XV in FIG. 16;

FIG. 16 is a partial view in transverse section of the device, taken on the section line XVI—XVI in FIG. 15, the one or more interposition means employed according to the invention being shown in the retracted waiting position;

FIG. 17 is an isolated view in perspective of one of the locking means with which the device is provided;

FIG. 18 is a half-view similar to that in FIG. 16, the one or more interposition means being shown in the extended operating position;

FIG. 19 is a partial view, partly in elevation and partly in section, of another torsion damper device according to the invention, the interposition means with which this torsion damper device is provided being shown in the retracted waiting position;

FIG. 20 is a view similar to that in FIG. 19, this interposition means being shown in the extended operating position; and FIGS. 21 and 22 are views respectively similar to those in FIGS. 19 and 20 and relate to another modified embodiment.

In general, these figures illustrate, by way of example, the application of the invention to the construction of a clutch plate assembly with a damper hub.

As is known, a clutch plate assembly of this type essentially comprises a hub 10, a hub disc 11, radially forming an annular component surrounding the hub 10, two annular guide discs 12, which extend parallel to the hub disc 11, on either side of the latter, around the hub 10, and which are connected to one another by means of short axial columns 13 passing through the hub disc 11 by means of grooves 14 provided for this purpose at the periphery of the latter, and a friction disc 15, which carries friction linings 16 at its periphery and on either side of the latter.

In the illustrative embodiment shown in FIGS. 1 to 5, the friction disc 15 is fixed to the guide discs 12 whilst being joined to one of the latter by means of the same columns 13 which fix one of these guide discs 12 to the other, the guide discs 12 are free to rotate about the hub 10 within the limits of a determined angular movement, as will become apparent below, and the hub disc 11 is fixed to the hub 10.

A clutch plate assembly of this type thus comprises two coaxial parts mounted for rotation relative to one another, within the limits of the determined angular movement mentioned above, namely a part A, which is formed by the friction disc 15 and the guide discs 12 and is referred to in this text as the exciter part by wa of convenience, this part A in general being intended to be integral in rotation with a driving shaft, which is the output shaft of the engine in the case of a motor vehicle, and a part B, which is formed by the hub disc 11 and the hub 10 and is referred to in this text as the excited part by way of convenience, this part B in general being intended to be integral in rotation with a driven shaft, which is the input shaft of a gearbox, for example, in the case of a motor vehicle.

Parallel to one another, these parts A, B comprise at least one annular component, namely the hub disc 11 in the case of the part A and one or other of the guide discs 12 in the case of the part B, as in FIG. 2.

The angular movement between the parts A, B constructed in this way takes place against the action of resilient members 18A, 18B, which are each adapted to act circumferentially between them for at least a range of the said angular movement, and which are each individually housed partly in an aperture 19 in the hub disc 11 and partly in apertures 20 in the guide discs 12.

In the illustrative embodiment shown, these resilient members are helical springs which essentially extend tangentially relative to a circumference of the whole arrangement.

For the spring 18A, which is a spring of relatively slight stiffness and which is the only such spring in the illustrative embodiment shown, the circumferential development of the aperture 19 in the hub disc 11 in which the spring is housed is equal to the circumferential development of the apertures 20 in the guide discs 12 in which the spring is also housed.

On the other hand, for the springs 18B, which are springs of relatively high stiffness and of which there are four in the illustrative embodiment shown, being arranged in group of two on either side of the spring 18A, the circumferential development of the apertures 19 in the hub disc 11 is greater than the circumferential development of the apertures 20 in the guide discs 12, with the result that, between the corresponding radial edges of these apertures, there is a circumferential play J1 for that direction of rotation of the clutch plate assembly which, as shown by an arrow F1 in FIG. 1, corresponds to "traction" operaton of the latter, and a circumferential play J2 for the reverse direction of rotation, which corresponds to "overrun" operation of this clutch plate assembly.

For example, and as shown, the circumferential play J1, measured angularly, can be less than the circumferential play J2.

In the illustrative embodiment shown, the plays J1, J2 are identical for all the springs 18B of high stiffness, but it is self-evident that the situation can be otherwise.

In the illustrative embodiment shown, the clutch plate assembly in question comprises two friction washers 21, which are each arranged respectively on either side of the hub disc 11, in contact with the latter, and a corrugated washer 23, with axial elasticity, which bears on a guide disc 12 and acts on the corresponding friction washer 21 via a distribution washer 24 integral in rotation with this guide disc 12.

A clutch plate assembly of this type is in itself well known; it will not be described in greater detail in this text.

Its operation is also well known.

It is illustrated by the graph in FIG. 6, in which the angular movement D between the parts A, B is plotted on the abscissa and the torque C transmitted from one of these parts to the other is plotted on the ordinate.

When a driving torque is applied to the exciter part A in the direction of the arrow F1 in FIG. 1, it is progressively transmitted to the excited part B by means of the springs 18A, 18B.

In a first stage, for low torque values, this being the case in neutral with the vehicle stationary, only the spring 18A of slight stiffness intervenes in order to eliminate the corresponding neutral noise, the springs 18B of high stiffness being at a distance from the corresponding edge of the apertures 19 in the hub disc 11 in which the said springs are housed, because of the circumferential play J1 specified above (line a on the graph).

In a second stage, as soon as the couple increases for "traction" operation, the spring 18A of slight stiffness is saturated, and the circumferential play J1 is taken up, for a value D1 of the angular movement corresponding to this circumferential play J1.

The springs 18B of high stiffness then come into action until they are saturated, this saturation occurring for a value D2 of the angular movement forming the corresponding limit of the latter (line a+b on the graph).

For "overrun" operation, a similar procedure develops and the springs 18A, 18B, which were previously compressed, first expand until the circumferential play J1 for the springs 18B of high stiffness reappears, and then, as soon as the torque cancels out and becomes negative, this being virtually instantaneous, the springs are recompressed, the spring 18A of slight stiffness being the first to be recompressed and the springs 18B of high stiffness only intervening for an angular movement D'1 corresponding to the taking-up of the circumferential play J2 specified above.

Overall, the spring 18A of slight stiffness thus acts by itself in a neutral noise filtration zone P extending from the angular movement D1, for "traction" operation, to an angular movement D'1, for "overrun" operation, and the springs 18B of high stiffness only add their effect to the spring 18A of low stiffness on either side of this neutral noise filtration zone P.

Of course, in order to simplify the graph in FIG. 6, no account has been taken, in this text, of the hysteresis phenomenon which conjointly develops because of the internal friction of the clutch plate assembly.

According to the invention, an interposition means 26 is incorporated into this clutch plate assembly with a damper hub, which clutch plate assembly thus comprises two coaxial parts A, B mounted for rotation relative to one another, within the limits of a determined angular movement, and against the action of resilient members 18A, 18B adapted to act circumferentially between them for at least a range of the said angular movement, and the said interposition means is sensitive to the angular movement between the said parts, against the action of return means, and is thus movable reversibly between a retracted waiting position, in which it is inoperative, and, beyond a determined value of the said movement, an operating position, in which, bearing circumferentially on either one of the said parts A, B, either directly or indirectly, it is adapted to provide circumferential support for at least one of the said elastic members 18A, 18B, with the result that the operational characteristics of the whole arrangement are modified.

In the illustrative embodiment shown in FIGS. 1 to 5, only one interposition means 26 is provided.

This interposition means 26 is carried by the excited part B and it is adapted to provide, by itself, circumferential support for one of the springs 18B of high stiffness, as will become apparent below.

In practice, in the illustrative embodiment shown in FIGS. 1 to 5, the interposition means 26 is formed by two identical brackets which are each arranged respectively on either side of the hub disc 11, between the latter and the corresponding guide disc 12, and are conjointly mounted for rotation on this hub disc 11, about a pin 27 parallel to the axis of the whole arrangement; by means of the pin 27, the interposition means constructed in this way thus bears circumferentially on the hub disc 11.

At one of its ends, the brackets of which the interposition means is composed conjointly form a beak 28 by means of which, in the operating position, as in FIG. 5, the interposition means is capable of hooking circumferentially onto the particular spring 18B of high stiffness.

At its other end, the brackets of which the interposition means is composed each possess a lug 29 at right angles, in the opposite direction to the hub disc 11, which lug passes through the corresponding guide disc 12, with play, by means of an elongate hole 30 provided in the latter for this purpose, and engages, on the other side of this guide disc 12, with a spring 31 carried by the latter.

The two springs 31 used in this way conjointly form the return means associated with the interposition means 26.

Each of these springs 31 comprises a central part 32, by means of which it is engaged on the corresponding guide disc 12, at the periphery of the latter, by means of two grooves 33, at right angles, which the latter possesses for this purpose, and two lateral flanges 34, which extend approximately radially along this guide disc 12, in the direction of the axis of the whole arrangement, and are resiliently engaged on the corresponding lug 29 of the interposition means 26.

For relatively low values of the angular movement between the parts A, B, and hence for relatively low values of the torque transmitted by the said parts, the interposition means 26 remains in the retracted waiting position, as in FIG. 1, in which its retaining nose 28 is at a distance from the particular spring 18B of high stiffness.

The operation of the clutch plate assembly in question is then as described above, and the graph representing this operation is as in FIG. 6.

For a sufficient, determined, value of the angular movement between the parts A, B, and hence of the torque transmitted by the latter, the interposition means 26, under the effects of the springs 31 which are carried along by the guide discs 12, changes over to the extended operating position, as in FIG. 5.

Consequently, if the operation of the whole arrangement changes over from a "traction" operating mode to an "overrun" operating mode, the retaining nose 28 of the interposition means 26 is interposed on the path followed by the corresponding end of the particular spring 18B of high stiffness in the course of its expansion which is characteristic of this changeover, with the result that the course of expansion of this spring 18B of high stiffness is therefore interrupted.

For the purpose of simplification, it will be supposed hereafter, on the one hand that this interruption of the course of expansion of the particular spring 18B of high stiffness intervenes for the angular movement D1 specified above, and that, at rest, this spring 18B of high stiffness has a prestress which is greater than the stiffness of the spring 18A of slight stiffness.

This spring 18B of high stiffness, which is then supported on the one hand, by one of its ends, on the nose 28 of the interposition means 26 according to the invention, which is linked to the hub disc 11, and on the other hand, at its other end, on the guide discs 12 and the hub disc 11, and which is thus acted upon in compression, momentarily opposes the expansion of the spring 18A of slight stiffness.

This results in a modification of the operational characteristics of the clutch plate assembly, compared with the previous characteristics, the interposition means 26 according to the invention having taken the place, for the spring 18B in question, of the corresponding radial edge of the aperture 19 in the hub disc 11 in which the spring is housed, and everything proceeding as if the circumferential development of this aperture were modified in this way.

In practice, as shown on the graph in FIG. 7, this modification results in a sudden drop in the torque for the angular movement D1, and then in the continuation of the decrease in this torque and in the angular movement with a gradient which is greater than that resulting from the stiffness of the spring 18A of slight stiffness alone.

Thus, this spring 18A of slight stiffness is prevented from intervening alone for low torque values if the torque has exceeded a determined value beforehand, and this avoids noisy rocking of this clutch plate assembly during the changeover from direct operation to overrun operation.

Of course, for low torques, as soon as the angular movement between the exciter part A and the excited part B again becomes less than a determined value, corresponding to the value of the abscissa point D1 in the illustrative embodiment envisaged, the interposition means 26 returns to the retracted waiting position under the action of the springs 31 which constitute the return means thereof.

However, friction means, which are not shown in the figures, are preferably provided in order to delay this return of the interposition means to the retracted waiting position.

If the spring 18B of high stiffness, with which the interposition means 26 cooperates, has no prestress at rest, the drop in torque for the angular movement D1 does not take place along an approximately vertical line, as previously, but along a slightly inclined line.

Of course, several springs 18B of high stiffness can be involved in the intervention of one or more interposition means 26, and, in practice, at least two interposition means 26 are provided, in positions symmetrically opposite one another, in order to prevent their intervention from inducing any radial component along the axis of the whole arrangement.

However, at least for certain applications, it can be advantageous for the number of springs 18B involved in the intervention of one or more interposition means according to the invention to be such that it does result in a radial component along the axis of the whole arrangement.

In fact, in this case, a variable radial hysteresis develops, the radial displacement of the part A relative to the part B, due to this radial component, inducing radial friction either between the guide discs 12 and the friction washers 21 or between the friction washers 21 and the hub disc 11.

For other applications, it can likewise be advantageous for all the springs 18B in question to be involved in the intervention of one or more interposition means according to the invention; in fact, this results in the production of a particular hysteresis, the said springs acting conjointly as a single unit, at constant torque, for a portion of the angular movement between the parts A, B in question.

In the modified embodiments illustrated by FIGS. 8 to 13, there are associated with the interposition means 36 employed according to the invention, on the one hand a support means 37, which extends axially and with which, in the extended operating position, the interposition means is adapted to bring about positive circumferential support, and on the other hand an annular plate 38, which is engaged by means of recesses 39 on the resilient members 18A, 18B provided between the parts A, B of the clutch plate assembly in question, without circumferential play for at least one of the members, and with circumferential play for the others, as will become apparent below, and which forms a component carrying either one of the means comprising the interposition means 36 and the support means 37, whilst the other of the said means is fixed to a component belonging to either one of the said parts A, B.

In practice, these FIGS. 8 to 11 illustrate, by way of example, the application of the invention to a clutch plate assembly of the type described in the French Patent filed on Apr. 24, 1974 under No. 74/14,147 and published under No. 2,268,994, and also in the Addition, attached to this patent, filed on Aug. 20, 1974 under No. 74/28,507 and published under No. 2,282,577.

This clutch plate assembly is similar to the one described above, but has the following differences: firstly, two springs 18A of slight stiffness are provided in diametrically opposite positions and are mounted in opposition, one of these springs being compressed while the other expands, and vice versa, depending on the direction of rotation; secondly, the springs of high stiffness are divided into two groups 18B, 18B', the circumferential plays associated with the springs 18B being respectively greater than the circumferential plays associated with the springs 18B', with the result that the intervention of the springs 18B' is delayed relative to that of the springs 18B, both in one direction of rotation and in the other (not shown in detail in the figures).

In these embodiments, there are two interposition means 36, arranged in diametrically opposite positions; a support means 37 is associated with each of these interposition means, and the interposition means 36 are carried by the part B, and more precisely by the hub 10, the associated support means 37 themselves being carried by the annular plate 38.

However, it is self-evident that a reverse arrangement could be adopted, the interposition means 36 being carried by the annular plate 38 and the support means 37 being carried by the part A.

It is also self-evident that the part B could take the place of the part A in either case.

In practice, in the embodiments shown, the annular plate 38 associated with the interposition means 36 is inserted axially between the hub disc 11 and the friction disc 15, at right angles to the radial part of the bearing 47 which is normally inserted between this friction disc 13 and the corresponding guide disc 12, on the one hand, and the hub 10, on the other hand, and the recesses 39 which the annular plate possesses for its engagement on the springs 18A, 18B, 18B' consist of grooves which the pate possesses at its internal periphery.

In the illustrative embodiment shown, it is on the springs 18B that this annular plate 38 is engaged, without play, by means of its corresponding recesses 39.

In other words, for the springs 18B, the recesses 39 are matched to the circumferential development of these springs, for the desired engagement without play, the said circumferential development corresponding to that defined by the corresponding apertures 20 in the guide discs 12.

On the other hand, for the springs 18A and 18B', the recesses 39 in the annular plate 38 extend beyond the said springs circumferentially on either side.

Likewise, for the passage of the axial columns 13, this annular plate 38 possesses elongate holes 49 through which the said columns 13 pass with play.

Thus, in such an embodiment, the annular plate 38 is mounted so as to float, this annular plate 38 being in contact, radially, in its plane, only with the springs 18B, by means of the radial edges of its corresponding recesses 39.

This arrangement advantageously makes it possible to compensate possible factory tolerances and/or assembly tolerances.

However, it is self-evident that, if desired, rigid centering of the annular plate 38 can be achieved either by means of the axial columns 13 or by means of the bearing 47, through contact with these columns or this bearing.

According to the embodiments shown, the interposition means 36 employed according to the invention consist of simple plates.

For the holding and guiding of these plates, the hub 10 of the part A radially carries a flange 40, which is integral therewith in rotation, this flange being, for example according to a technique which is in itself known, engaged by force on the hub 10 and crimped onto the latter, on the outside of the volume formed by the guide discs 12, on one or other side of the clutch plate assembly.

This flange 40 comprises two guides which extend radially and with each of which an interposition means 36 is engaged.

In the illustrative embodiment shown, this guide simply consists of a recess 41 in the flange 40, and the corresponding interposition means 36 is simply mounted for sliding in this recess 41.

For keeping an interposition means 36 axial, two strips 42 are joined to the latter, for example by welding, on either side of the bracket 40, and these strips 42 extend circumferentially beyond the corresponding recess 41, as in FIGS. 8 and 9.

At the end of each recess 41, the flange 40 possesses a retaining nose 44, which circumferentially protrudes into the said recess 41, as in FIG. 9.

Conjointly, the support means 37 associated with the interposition means 36 consist of lugs which extend axially in the direction of the flange 40, by means of passages 45 in the friction disc 15, and which extend axially to a sufficient degree to interfere with the path of the interposition means 36 in the recesses 41 in which the plates are mounted for sliding.

These lugs 37 are carried by the annular plate 38.

Beyond a shoulder 50 capable of cooperating in abutment with the corresponding retaining nose 44, each plate 36 comprises a radial extension 51 capable of being circumferentially gripped between this retaining nose 44 and the corresponding axial lug 37.

In practice, for the rest position shown in FIG. 9, the circumferential development L between, on the one hand, the lateral edge 52 of an axial lug 37 which is circumferentially closest to the corresponding retaining nose 44, and, on the other hand, the lateral edge 53 of the corresponding interposition means 36 which is circumferentially furthest from this retaining nose 44, at most corresponds, angularly, to the circumferential play J1 defined above.

Moreover, of course, each retaining nose 44 has a sufficiently reduced circumferential development for it not to oppose an engagement, opposite its own lateral edge, of the radial extension 51 of the corresponding plate 36.

In the illustrative embodiment shown in FIGS. 8 to 11, the two interposition means 36 share the return means which are associated therewith, and the said means consist of a torsion spring 56, of which the central torsion part 57 surrounds the hub 10, and of which the arms 58 are each respectively engaged with the interposition means 36 by means of an axial return 59, this return 59 being engaged in a passage provided for this purpose in this interposition means and being bent back at its end beyond this passage.

In the illustrative embodiment shown, the torsion spring 56 is axially arranged between the flange 40 and the corresponding guide disc 12, but it is self-evident that, as a variant, it can be arranged axially beyond this flange 40, relative to this guide disc 12; this is moreover the case in the modified embodiment illustrated in FIGS. 13, 14.

According to a characteristic of the invention, and as shown in FIG. 12, the central torsion part 57 of the spring 56, from which part the arms 58 of the spring originate, results from the winding together, in a coil, of the two strands of a wire bent into a U beforehand.

In other words, this central torsion part 57 possesses an end, it forms an elbow 60 at this end, and the transverse plane, perpendicular to the axis of the whole arrangement, which passes through this elbow 60 is a plane of symmetry S for the spring 56; this plane of symmetry S is represented diagrammatically by a broken line in FIG. 12.

At the point where it is connected to the central part 57 from which it originates, each arm 58 to the spring 56 forms an elbow 61 in the direction of the corresponding interposition means 36, as in FIGS. 9 and 11.

At the internal periphery of the central torsion part 57 of the spring 56, plates at right angles are joined at various places, for example by welding, to the guide disc 12 in question, in order suitably to hold this torsion spring 57 (not shown in detail in the figures).

Moreover, for changeover of the plates 36 to the extended operating position, the central torsion part 57 of the torsion spring 56 is angularly locked on the hub 10 which it surrounds and which belongs to the excited part B, and a shoulder 63 is associated with each of the arms 58 of this torsion spring 56, which shoulder is fixed to the exciter part A and on which this arm 58 is capable of bearing by means of its elbow 61.

In the illustrative embodiment shown, the central torsion part 57 of the torsion spring 56 is fixed to the hub 10 by gripping, this central part being arranged between, on the one hand, two diametrically opposite bosses 65 on the flange 40 fixed to the hub 10, and, on the other hand, lugs 66 joined to these bosses 65, for example by welding; in the figures, only one of these bosses 65 is shown, as in FIG. 8.

Moreover, in the illustrative embodiment shown, each shoulder 63 is formed at the end of a lug 67 which is joined, for example by welding, to the corresponding guide disc 12 which belongs to the exciter part A, as in FIG. 11.

When the vehicle is stationary, as in FIG. 9, the plates of which the interposition means 36 according to the invention are composed occupy, in practice, their retracted waiting position, bearing against the bottom of the corresponding recess 41 in the flange 40.

These of the interposition means 36 are then inoperative.

If, for traction operation with the clutch plate assembly rotating in the direction of the arrow F1 in FIG. 9, a torque is applied to the friction disc 15 in the direction of this arrow F1, only the springs 18A of slight stiffness initially intervene, between the two parts A, B of which the clutch plate assembly is composed, for the transmission of this torque; subsequently, first the springs 18B and finally the springs 18B' come into action successively.

However, for this traction operation and in proportion with the corresponding angular movement between the exciter part A and the excited part B, the shoulders 63 provided for this purpose of the exciter part A push the elbows 61 of the arms 58 of the torsion spring 56 and, under this action, these arms gradually cause the radial displacement of the interposition means 36 along their guides, in the direction of the corresponding retaining nose 44.

Conjointly, the axial lugs 37 on the annular plate 38 progressively move away from these retaining noses 44 circumferentially, the annular plate 38 then being linked in rotation to the guide discs 12 by means of the springs 18B because, by means of its corresponding recesses 39, this plate is engaged on these springs without play.

For a determined value of the angular movement between the exciter part A and the excited part B, which can correspond, for example, to the value of this movement for which the springs 18B come into action, the plates 36, under the action of the arms 58 of the spring 56, occupy an extended operating position in which they are radially in abutment, via their shoulder 50, against the retaining noses 44, and their radial extension 51 is circumferentially inserted between these retaining beaks and the axial lugs 37 on the annular plate 38.

If operation continues to be "traction" operation, that is to say if the torque to be transmitted between the parts A, B of which the clutch plate assembly in question is composed continues to increase, the angular movement between the said parts A, B continues to increase up to its final value, following a procedure similar to that described above.

On the other hand, if, by relaxing the depression action previously exerted on the accelerator of the vehicle in question, the operation of the whole arrangement changes over from this "traction" operation to "overrun" operation, and if the excited part B of the clutch plate assembly, which consists of the hub 10 and the hub disc 11, consequently undergoes a relative angular movement which is retrograde relative to the exciter part A of this clutch plate assembly, which consists of the guide discs 12 and the friction disc 15, the plates forming the interposition means 36 according to the invention are then capable of intervening in the course of expansion of the springs 18B of high stiffness, during this changeover from a "direct" operating mode to an "overrun" operating mode, providing positive circumferential support for these springs 18B via the annular plates 38.

In fact, because they bear circumferentially on the excited part B, since they are integral therewith in rotation, and because their radial extension brings about positive circumferential support with the axial lugs 37 of the support plate 38, firstly as a result of their extended operating position and secondly as a result of the retrograde angular movement of the excited part B to which they are linked, they then offer, at the end of this retrograde movement, positive circumferential support for the support plate 38.

The operational characteristics of the clutch plate assembly in question are thereby modified, the interposition means 36 thus taking the place, via the annular plate 38, of the corresponding radial edges of the apertures 19 in the hub disc 11, in which apertures the springs 18B of high stiffness are housed, and therefore modifying the circumferential development of these apertures.

In practice, any filtration range due only to the springs 18A of slight stiffness is then eliminated.

For the extended operating position of the interposition means 36, play can remain circumferentially between the radial extension 51 of these plates 36 and the corresponding retaining nose 44, the bearing of these plates 36 on the flange 40 taking place, by means of their corresponding lateral edge, in the corresponding recess 41 in this flange 40; as a variant, the radial extension 51 of an interposition means 36 can bear circumferentially on the corresponding retaining nose 44, the retaining beaks 44 then serving the dual purpose of circumferential support and radial retention.

Of course, as previously, for low torques, as soon as the angular movement between the exciter part A and the excited part B drops again, the interposition means 36 escape from the axial lugs 37 on the support plate 38 and are progressively returned to the retracted waiting position by means of the arms 58 of the torsion spring 56 to which they are coupled, and, also as previously, friction means, which are not shown in the figures, are preferably provided between these interposition means 36 and the recesses 41 in which the plates are mounted for sliding, in order to delay the return to the retracted waiting position.

In the foregoing text, the elastic members involved with the interposition means according to the invention are only the springs 18B of high stiffness, the circumferential development L specified above having a value appropriate for this purpose.

However, it is self-evident that, depending on the desired effects, this value L can be modified, for example so that the springs 18A of slight stiffness are also involved, or so that the springs 18B' of high stiffness are the only ones involved, the annular plate 38 consequently being installed.

In general, whatever the embodiment of the invention, an interposition means according to the invention can intervene on any one of the elastic members circumferentially interposed between the parts A, B.

According to the modified embodiment illustrated in FIGS. 13 and 14, cam means are provided between the interposition means 36 and the annular plate 38.

In the embodiment shown, these cam means comprise, for each interposition means 36, a finger 70, axially carried by an angle-piece 71 fixed to the corresponding axial lug 37 of the annular plate 38, and a slot 72 which has an oblique flank 73 and is provided in this interposition means 36, the finger 70 being engaged in the said slot 72 and bearing against the oblique flank 73 of the latter.

In practice, in the illustrative embodiment shown, the slot 72 possesses a circumferential extension 74 at the end of its oblique flank 73.

The operation of this modified embodiment is similar to that described above; in proportion with the angular movement between the exciter part A and the excited part B, the fingers 70 associated with the interposition means 36 progressively bring about the radial displacement of the latter, which, for a determined value of this movement, causes them to be inserted circumferentially, by means of their radial extension 51, between the retaining nose 44 and the axial lugs 37.

If this angular movement continues, the fingers 70 follow the circumferential extensions 74 of the slots 72 without interfering with the operation of the whole arrangement.

In the modified embodiment illustrated in FIGS. 15 to 18, the interposition means employed according to the invention are levers 76, which are each mounted for rotation on the hub disc 11 by means of a pivot 77, and which are each arranged in a recess 78 in the annular plate 38, which recess is provided for this purpose at the internal periphery of the latter.

In the illustrative embodiment shown, the support means associated with this lever 76 is an abutment shoulder 80, which is provided for this purpose on the annular plate 38, and which, formed in this illustrative embodiment by means of the corresponding recess 78 in the said plate, extends axially as above.

Moreover, the return means associated with this lever 76 comprise a spring 81, which, at one end, is coupled to this lever 76, and which, by its other end, is coupled to the annular plate 38 by means of the other recess 78 in the latter.

For the changeover of a lever 76 from its retracted waiting position to its extended operating position, cam means are provided between this lever 76 and the annular plate 38.

In the illustrative embodiment shown, these cam means comprise a ramp 82, which is provided on the innermost circumferential edge of the corresponding recess 78 in the annular plate 38, and a ramp 83, which is provided on the corresponding edge of the lever 76 in question.

During traction operation, the exciter part A is caused to rotate in the direction of the arrow F3 in FIG. 16 and it rotates in the same direction relative to the excited part B, whilst at the same time carrying the latter along, and, in a first stage, for a first range of the corresponding angular movement, only the springs 18A of slight stiffness intervene.

For this first range of the angular movement, the levers 76 remain in the retracted waiting position, as in FIG. 16, under the action of the springs 81.

This situation continues until the torque transmitted from the exciter part A to the excited part B increases and the angular movement between these parts A, B reaches a determined value, as above.

Consequently, under the control of the ramps 82 on the annular plate 38, the levers 76 change over to the extended operating position, as in FIG. 18, in which the free end of each of these levers lies approximately on one and the same circumference as the abutment shoulder 80 provided for this purpose on this annular plate 38.

If a reversal of torque then takes place, which is characteristic of a changeover from traction operation to overrun operation, the buttress levers 76 engage with the annular plate 38, the consequences being the same as above.

As soon as the torque has returned to a sufficient value, the levers 76 are returned to the retracted waiting position by means of the springs 81.

Of course, as above, friction means are provided between the pivot 77 of this lever 76 and the housing of the hub disc 11 in which this pivot is engaged, in order to delay the return of this lever to the retracted position.

According to the modified embodiments illustrated in FIGS. 19 to 22, in which the exciter part A and excited part B are only shown in a simplified manner, the interposition means employed forms a bolt 102, which is mounted for radial sliding in a guide 103 fixed to a first of these parts A, B, opposite a ring 104 fixed to the second of the parts, the ring possessing an opening 105, forming a keeper for the bolt 102, and being carried by a hub 106 which is provided on the surface by cam means 107 capable of acting upon the bolt 102 in the direction of the keeper 105, these cam means 107 being angularly arranged at right angles to the opening forming the keeper 105.

In the embodiment illustrated in FIGS. 19 and 20, the guide 103 belongs to the exciter part A, while the ring 104 belongs to the excited part B.

As a variant, as in FIGS. 21 and 23, the guide 103 belongs to the excited part B, while the ring 104 belongs to the exciter part A.

Whatever the case may be, when the vehicle is stationary, as in FIGS. 19 and 21, the guide 103 and hence the bolt 102 are angularly at a distance from the opening forming the keeper 105, and from the cam means 107.

On the other hand, as soon as the angular movement of the exciter part A and the excited part B reaches a determined value, for example the value D1 specified above, the bolt 102 is located opposite the opening forming the keeper 105, and, under the thrust of the cam means 107, which in practice are a simple ramp, the bolt penetrates into this opening, as in FIG. 20.

The exciter part A therefore finds positive circumferential support on the excited part B, as above, through the guide 103, the bolt 102, the ring 104 and the hub 106.

Of course, return means are provided in order to return the bolt 102 to its retracted rest position when the angular movement between the exciter part A and the excited part B again becomes less than the value D1.

Moreover, as above, friction means are preferably provided between the bolt 102 and the guide 103 in order to delay the return of this bolt to the retracted rest position.

As will have been understood, in all the embodiments described above, the interposition means employed according to the invention is or are inevitably sensitive to centrifugal force, and the latter can have a positive effect on these means, in practice at sufficiently high speeds.

However, the changeover of this or these means from their retracted waiting position to their extended operating position is effected in a positive manner, independently of this speed.

As is the case in practice, this changeover can thus take place at insufficiently high speeds for the centrifugal force to have any substantial effect.

It is easy to understand from the foregoing text that the invention is capable of being put into effect in a wide diversity of applications.

Thus, it is not limited to the embodiments and forms of application which have been more particularly described and shown, but encompasses any variant.

In particular, it can equally well be applied to the torsion damper device comprising three coaxial parts mounted for rotation relative to one another, in pairs, as is the case, for example, in the clutch plate assembly described in detail in the French Patent filed on Aug. 29, 1973 under No. 73/31,172 and published under No. 2,242,606, and also in the Addition, attached to this patent, filed on Apr. 12, 1974 under No. 74/12,915 and published under No. 2,270,491.

In this clutch plate assembly, the interposition means according to the invention can intervene between any one or other of the various rotatable coaxial parts which it comprises.

Moreover, instead of intervening during the changeover from traction operation to overrun operation, the interposition means according to the invention can equally well intervene during the changeover from overrun operation to traction operation.

Finally, the field of application of the invention is obviously not limited only to that of clutch plate assemblies for motor vehicles, but covers the entire field of application of torsion damper devices.

I claim:

1. A torsion damper assembly of the type including at least two coaxial parts mounted for relative angular movement within predetermined limits of angular displacement, circumferentially acting resilient members opposing said relative angular movement of said coaxial parts over at least a range of angular displacement, the improvement comprising at least one intervening means responsive to relative angular movement between said coaxial parts for movement between a standby position and an operative position beyond a predetermined angular displacement, return means for urging said intervening means from said operative position toward said standby position, said intervening means effectively circumferentially bearing against one of said coaxial parts and engageable with one of said resilient members to define a circumferential abutment for said one resilient member in said operative position for modifying the operational characteristics of said torsion damper assembly.

2. The torsion damper assembly of claim 1, wherein said intervening means is carried by said one of said coaxial parts and defines a circumferential support for said one resilient member.

3. The torsion damper assembly of claim 2, wherein a pin disposed parallel to the axis of said torsion damper assembly rotatably mounts said intervening means of said one of said coaxial parts.

4. The torsion damper assembly of claim 3, wherein said intervening means comprises a nose for circumferentially hooking said one resilient member in said operative position of said intervening means.

5. The torsion damper assembly of claim 1, comprising an axially extending support means associated with said intervening means for providing said circumferential abutment in said operative position and an annular plate associated with said intervening means and having recesses receiving said resilient members between said coaxial parts, in circumferential engagement with said one resilient member and with circumferential clearance with respect to the other of said resilient members, said annular plate carrying a selected one of said intervening means and said support means, the nonselected one of said intervening means and said support means being part of a component fixed relative to one of said coaxial parts, whereby said annular plate cooperates with said intervening means to provide circumferential support for said one resilient member.

6. The torsion damper assembly of claim 5, wherein said intervening means is received in guide means, said support means being located in the path of movement of said intervening means in said guide means.

7. The torsion damper assembly of claim 6, wherein said intervening means comprises a plate and said guide means defines a radial recess in a flange.

8. A torsion damper assembly of claim 7, wherein said flange has a retaining portion protruding into said radial recess at the radially outer end thereof beyond a shoulder cooperable for radial abutment with said retaining nose, said intervening means having a radial extension against which said support means is adapted to bear.

9. The torsion damper assembly of claim 6 wherein said guide means is part of said one coaxial part, said support means being carried by said annular plate.

10. The torsion damper assembly of claim 6, wherein said return means opposing said intervening means comprises a torsion spring the middle part of which encircles a hub fixed to a first of said coaxial parts, one arm of said torsion spring being attached to said intervening means.

11. The torsion damper assembly of claim 10, wherein for movement of said intervening means from said standby position to said operative position, said torsion spring arm comprises a bend cooperable with a shoulder fixed to a second of said coaxial parts, said middle part of said torsion spring being fixed angularly relative to said hub.

12. The torsion damper assembly of claim 10, wherein for movement of said intervening means from said standby position to said operative position, cam means are operatively disposed between said intervening means and said annular plate.

13. The torsion damper assembly of claim 12, wherein said cam means comprise finger means carried axially on said annular plate, and a slot having an inclined edge being formed in said intervening means, said finger means being received in said slot.

14. The torsion damper assembly of claim 13, wherein said slot has a circumferential extension.

15. The torsion damper assembly of claim 1, wherein at least two said intervening means are arranged in diametrically opposite directions.

16. The torsion damper assembly of claim 10, wherein at least two said intervening means are arranged in diametrically opposite positions, said return means having two said arms attached to the respective intervening means, said middle part of said torsion spring comprising two coiled wire portions with a U-bend therebetween.

17. The torsion damper assembly of claim 1, wherein said intervening means comprises a lever, one end of said lever being pivotally mounted on said one coaxial part about an axis parallel to the axis of said torsion damper assembly, said support means comprising an abutment shoulder on said annular plate, the other end of said lever being cooperable with said abutment shoulder.

18. The torsion damper assembly of claim 17, wherein for movement of said lever from said standby position to said operative position, cam means are provided between said lever and said annular plate.

19. The torsion damper assembly of claim 18, wherein said lever extends substantially chordally of said torsion damper assembly.

20. The torsion damper assembly of claim 1, wherein said intervening means comprises a bolt member mounted for sliding movement in a guide fixed relative to said one coaxial part, a ring disposed facing said guide being fixed relative to the other of said coaxial parts, a transverse opening in said ring defining a keeper member for said bolt member, said ring being mounted on a hub having a surface with cam means cooperable with said bolt member for urging the latter toward said opening in said ring.

21. The torsion damper assembly of claim 1, wherein friction means are provided for delaying the movement of said intervening means from said operative position to said standby position under the action of said return means.

22. The torsion damper assembly of claim 1, wherein the number of said resilient member controlled by said intervening means is such that a said radial component is produced relative to the axis of said torsion damper assembly.

23. The torsion damper assembly of claim 1, wherein all said resilient members are affected by said intervening means.

24. The torsion damper assembly of claim 21, wherein the number of said resilient member controlled by said intervening means is such that a said radial component is produced relative to the axis of said torsion damper assembly.

25. The torsion damper assembly of claim 21, wherein all of said resilient members are affected by said intervening means.

26. The torsion damper assembly of claim 7, wherein said guide means is part of said one coaxial part, said support means being carried by said annular plate.

27. The torsion damper assembly of claim 8, wherein said guide means is part of said one coaxial part, said support means being carried by said annular plate.

28. A torsion damper assembly of the type including at least two coaxial parts mounted for relative angular movement within predetermined limits of angular displacement, said coaxial parts comprising respective parallel annular components, circumferentially acting resilient members opposing said relative angular movement of said coaxial parts over at least a range of angular displacement, each of said resilient members being housed partly in an aperture formed in the annular component of one of said coaxial parts and partly in an aperture in the annular component of the other of said parts, said apertures having circumferentially opposed radial edges, the improvement comprising at least one intervening means responsive to relative angular displacement between said coaxial parts for movement between a standby position and an operative position beyond a predetermined relative angular displacement, return means for urging said intervening means from said operative position toward said standby position, said intervening means effectively taking the place of one of the radial edges of one of said apertures housing one of said resilient members in said operative position of said intervening means.

29. A torsion damper assembly according to claim 1, wherein said one of said resilient members has a circumferential abutment which prevents disablement thereof.

30. A torsion damper assembly according to claim 29, wherein there is at least one relatively weak resilient member, said intervening means providing circumferential engagement for said relatively stiff resilient member so that the relatively weak resilient member does not act alone at low values of torque on pull back operation.

* * * * *